United States Patent
Morales Espejel et al.

(10) Patent No.: US 9,670,959 B2
(45) Date of Patent: Jun. 6, 2017

(54) BEARING WITH IMPROVED RESISTANCE TO MICROPITTING

(71) Applicant: AKTIEBOLAGET SKF, Göteborg (SE)

(72) Inventors: Guillermo Morales Espejel, Ijsselstein (NL); Kenred Stadler, Schweinfurt (DE); Victor Brizmer, Nieuwegein (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/766,321

(22) PCT Filed: Feb. 6, 2013

(86) PCT No.: PCT/EP2013/052334
§ 371 (c)(1),
(2) Date: Aug. 6, 2015

(87) PCT Pub. No.: WO2014/121829
PCT Pub. Date: Aug. 14, 2014

(65) Prior Publication Data
US 2016/0108960 A1    Apr. 21, 2016

(51) Int. Cl.
| | |
|---|---|
| F16C 19/22 | (2006.01) |
| F16C 33/36 | (2006.01) |
| F16C 19/52 | (2006.01) |
| F16C 33/58 | (2006.01) |
| B23P 9/00 | (2006.01) |
| B24B 19/06 | (2006.01) |
| F16C 33/64 | (2006.01) |

(Continued)

(52) U.S. Cl.
CPC .............. *F16C 33/585* (2013.01); *B23P 9/00* (2013.01); *B24B 19/06* (2013.01); *F16C 19/22* (2013.01);

(Continued)

(58) Field of Classification Search
CPC ........ F16C 19/22; F16C 19/52; F16C 33/583; F16C 33/64; F16C 2240/54; B23P 9/00;

(Continued)

(56) References Cited

U.S. PATENT DOCUMENTS

| | | | |
|---|---|---|---|
| 4,658,800 A | * | 4/1987 | Larsson .................. B24B 53/08 125/11.03 |
| 5,503,481 A | | 4/1996 | Hashimoto et al. |

(Continued)

FOREIGN PATENT DOCUMENTS

| | | |
|---|---|---|
| EP | 1510706 A2 | 3/2005 |
| GB | 2269213 A | 2/1994 |

*Primary Examiner* — Marcus Charles
(74) *Attorney, Agent, or Firm* — Bryan Peckjian; SKF USA Inc. Patent Dept.

(57) ABSTRACT

A bearing comprising a plurality of rolling elements arranged between an inner and outer raceway thereof. A rolling contact interface is between a first rolling contact surface on at least one rolling element and a second rolling contact surface formed by one of the inner and outer raceways. The first rolling contact surface has a first RMS roughness $R_{q1}$ and a first roughness pattern $\gamma_1$, expressed in terms of the Peklenik number $\gamma$. The second rolling contact surface has a second RMS roughness $R_{q2}$ and a second roughness pattern $\gamma_2$. To minimize micropitting in the bearing, the rolling contact interface has a surface topography wherein (a) the roughness pattern of the first and second rolling contact surfaces are oriented in the direction of rolling, whereby $\gamma_1 \geq 3.0$ and $\gamma_2 \geq 10.0$; and (b) the first and of the second rolling contact surfaces have substantially equal roughness heights, whereby $0.8 \leq R_{q1}/R_{q2} \leq 1.25$.

6 Claims, 1 Drawing Sheet

(51) Int. Cl.
*G01B 7/34* (2006.01)
*F16C 19/36* (2006.01)

(52) U.S. Cl.
CPC .............. *F16C 33/36* (2013.01); *F16C 33/64* (2013.01); *F16C 19/364* (2013.01); *F16C 19/52* (2013.01); *F16C 2240/54* (2013.01); *F16C 2240/70* (2013.01); *G01B 7/34* (2013.01); *Y10T 29/49684* (2015.01)

(58) Field of Classification Search
CPC .......... B24B 19/06; G01G 7/34; G01B 21/30; Y10T 29/49684; C23C 22/73
USPC ............ 384/450, 516, 569, 625; 29/898.066, 29/898.13, 898.063; 72/105; 125/11.01
See application file for complete search history.

(56) References Cited

U.S. PATENT DOCUMENTS

| | | | | |
|---|---|---|---|---|
| 5,586,826 | A * | 12/1996 | Kellstrom | F16C 33/585 384/450 |
| 5,814,722 | A * | 9/1998 | Pratt | G01B 21/30 73/105 |
| 6,172,852 | B1 * | 1/2001 | Boutaghou | G11B 5/4833 360/244.5 |
| 6,725,720 | B2 * | 4/2004 | Kiuchi | F16C 33/64 148/906 |
| 6,735,868 | B2 * | 5/2004 | Loose | B23P 9/00 29/898.063 |
| 7,435,007 | B2 * | 10/2008 | Ueda | F16C 23/086 384/516 |
| 7,837,393 | B2 * | 11/2010 | Matsuzaki | F16C 23/086 384/495 |
| 8,955,225 | B2 * | 2/2015 | Kobayashi | B24C 1/04 29/898 |
| 9,003,663 | B2 * | 4/2015 | Kelsey | F16C 33/34 29/898.01 |
| 2002/0051594 | A1 * | 5/2002 | Takehara | F16C 19/225 384/450 |
| 2002/0181820 | A1 * | 12/2002 | Suzuki | F16C 19/364 384/571 |
| 2009/0092796 | A1 * | 4/2009 | Ishida | F16C 33/043 428/172 |

* cited by examiner though, however, relatively expensive. Consequently, there is room for improvement in terms of providing a bearing with increased resistance to micropitting, which can be manufactured in a straightforward and economical manner.

BEARING WITH IMPROVED RESISTANCE TO MICROPITTING

CROSS REFERENCE TO RELATED APPLICATIONS

This is a United States National Stage application claiming the benefit of International Application Number PCT/EP2013/052334 filed on 6 Feb. 2013 (6, Feb. 2013), which is incorporated herein by reference in its entirety.

FIELD OF THE INVENTION

The present invention relates to a roller bearing provided with a rolling contact surface topography that is adapted to reduce or prevent micropitting.

BACKGROUND TO THE INVENTION

Micropitting is a term introduced initially by the gear industry to describe tiny surface spalls and cracks, sometimes appearing on the surface of rolling/sliding contacts. The standard ISO 15243 [1] on Rolling Bearings—Damages and Failures—refers to this damage or failure mode as "surface distress" or "surface initiated fatigue", which is: The failure of the rolling contact metal surface asperities under a reduced lubrication regime and a certain percentage of sliding motion causing the formation of (1) burnished areas (glazed; grey stained), (2) asperity microcracks, (3) asperity microspalls.

In many industrial bearing applications, power density has increased substantially due to the need for higher efficiency (weight and cost reduction by downsizing). With the increasing severity of the working conditions (e.g. heavier loads in combination with higher temperatures, thinner oil films and/or boundary lubrication conditions) machine components can suffer from surface initiated fatigue (or micropitting). In rolling element bearings, micropitting is not necessarily a primary failure mode, but it can facilitate/accelerate the appearance of other failure modes like indentations, surface initiated spalling and seizure.

Thus, micropitting is one of the mechanisms responsible for life-limiting bearing wear. One approach to mitigating the effects of micropitting is to ensure that the rolling contact surfaces in a bearing are always separated by a lubricant film of sufficient thickness. Especially when grease lubrication is employed, however, the bearing will at times operate under a boundary or mixed lubrication condition. In short, adequate film thickness cannot always be ensured.

A second approach to combating micropitting and improving the wear and fatigue life of bearings is to employ surface engineering techniques, which alter the chemical and/or topographical properties of the rolling contact surfaces. An example of such a technique is disclosed in U.S. Pat. No. 5,503,481, issued to The Timken Company. The patent describes a process for providing an isotropic finish on rolling contact surfaces of a bearing. After a machining operation such as grinding, which creates an oriented roughness profile on the rolling surface of a bearing component, the bearing component is immersed in a chemical solution which reacts with the bearing steel to form a protective coating. The chemical solution further comprises abrading elements which, via agitation, remove the protective coating on the upper elevations of the roughness profile, enabling a further chemical reaction with the underlying steel. The height of the roughness profile therefore diminishes, to leave shallow pits with no particular orientation (i.e. isotropic). Finally, in the absence of the chemical solution, the protective coating is removed.

The resulting finish is often referred to as a superfinish, and has been shown to significantly improve resistance to the mechanisms of bearing wear, including micropitting. Bearings with a superfinish are, however, relatively expensive. Consequently, there is room for improvement in terms of providing a bearing with increased resistance to micropitting, which can be manufactured in a straightforward and economical manner.

SUMMARY OF THE INVENTION

In rolling element bearings, lubrication and surface roughness play a key role in micropitting and surface damage. The present invention is based on the understanding that the role played by lubrication and roughness is very much related to the effect of local friction forces (at asperity level) and stress concentrations under boundary/mixed lubrication.

Thus, the object of the present invention is to define a rolling element bearing in which the surface topography of the rolling contact surfaces is designed to minimize mixed-lubrication pressures and subsurface stresses at asperity level. This is achieved by manufacturing the components of the bearing such that the rolling contact surfaces have correct roughness parameters, not only with regard to asperity heights, but also with regard to the directionality of the asperities.

Specifically, the invention resides in a bearing comprising a plurality of rolling elements arranged between an inner raceway and an outer raceway of the bearing, whereby a rolling contact interface is defined between a first rolling contact surface on at least one rolling element and a second rolling contact surface formed by one of the inner and outer raceways. The first and second rolling contact surfaces respectively have a first RMS roughness $R_{q1}$ and a second RMS roughness $R_{q2}$. Furthermore, the first and second rolling contact surfaces respectively have a first 3D roughness pattern $\gamma_1$ and a second 3D roughness pattern $\gamma_2$, which are expressed in terms of the Peklenik number $\gamma$. According to the invention, the rolling contact interface has a surface topography in which:

$0.8 \leq R_{q1}/R_{q2} \leq 1.25$;

$\gamma_1 \geq 3.0$; and $\gamma_2 \geq 10.0$.

The roughness parameter $R_q$ is the root-mean-square average roughness, which may be measured using, for example, an optical profilometer, in compliance with ISO 4288. $R_q$ is given by the following equation:

$$R_q = \sqrt{\frac{1}{LW} \int_0^L \int_0^W (z-\bar{z})^2 (x,y)\,dx\,dy}$$

where

L is the length of an evaluation area in the rolling direction (x);

W is the width of the evaluation area in the transverse direction (y);

z is the local surface height of the roughness and $\bar{z}$ is the mean surface height of the roughness.

The Peklenik number $\gamma$ is defined in, for example, "New Developments in Surface Characterization and Measurements by means of Random Process Analysis" published in 1967 in Vol. 102 of the Proceedings of the Institute of Mechanical Engineers. It is a measure of the isotropy of a surface, and may be visualized as the length-to-width ratio of a representative asperity. Thus, $\gamma=1$ for a perfectly isotropic surface; $\gamma=0$ for a surface with a purely transverse roughness pattern and $\gamma=\infty$ for a surface with a purely longitudinal roughness pattern. The Peklenik number is determined by means of a sampling technique such as described in "An Average Flow Model for Determining Effects of 3-dimensional Roughness on Partial Hydrodynamic Lubrication" published in 1978 in Vol. 100 of the Journal of Lubrication Technology.

In a bearing according to the invention, the roughness pattern of the first and the second rolling contact surface (bearing raceway) has a longitudinal orientation. The orientation of the second rolling contact surface, in particular, is highly longitudinal. The raceways of conventional bearings generally have a roughness pattern oriented in the longitudinal direction, but with a significantly lower Peklenik number than a bearing according to the invention. After analysis of several commercially available bearings, it was found that the raceways had a $\gamma$-value of between 5 and 8.

The first and second RMS roughness, $R_{q1}$ and $R_{q2}$, are preferably as equal as possible. This is based on the understanding that a rougher rolling contact surface imposes load micro cycles on a smoother, opposing rolling contact surface, in the presence of sliding and in the absence of full-film lubrication. In practice, the raceways of a bearing are generally somewhat rougher than the rolling elements. Consequently, in a bearing according to the invention, the requirement for longitudinal directionality of the roughness pattern of the second rolling contact surface (raceway) is greater than for the first rolling contact surface (rolling element).

The present inventors have found that other roughness parameters play a role in minimizing micropitting. In a bearing according to the invention, each of the first and second rolling contact surfaces has a roughness skewness $R_{sk} \leq -0.1$. The skewness parameter is given by the following equation:

$$R_{sk} = \frac{1}{LWR_q^3} \int_0^L \int_0^W (z-\bar{z})^3 (x,y) \, dx \, dy$$

The slope of the roughness profile in the rolling direction (x) and in the transverse direction (y) is also of importance, particularly in bearings with a mean diameter $d_m$ smaller than 300 mm. In a bearing according to the invention, each of the first and second rolling contact surfaces has a slope parameter, $R_{\Delta qx}$, in the direction of rolling (x), and a slope parameter, $R_{\Delta qy}$, in the transverse direction (y), with the following values when $d_m \leq 300$ mm:

$R_{\Delta qx} \leq 15$ mrad
$R_{\Delta qy} \leq 45$ mrad,

In large-size bearings having a mean diameter $d_m > 300$ mm:

$R_{\Delta qx} \leq 30$ mrad
$R_{\Delta qy} \leq 90$ mrad,

The slope parameter in the direction of rolling is given by the following equation:

$$R_{\Delta qx} = \frac{1}{LW} \int_0^L \int_0^W \frac{\partial z(x,y)}{\partial x} \, dx \, dy$$

The slope parameter in the transverse direction is given by the following equation:

$$R_{\Delta qy} = \frac{1}{LW} \int_0^L \int_0^W \frac{\partial z(x,y)}{\partial y} \, dx \, dy$$

Furthermore, the actual value of the first and second RMS roughness is important. In a bearing according to the invention, the first and second rolling contact surfaces have a maximum RMS roughness that is related to the mean diameter $d_m$ of the bearing as follows:

$R_{q1}$ and $R_{q2} \leq 8 \times 10^{-9} (1000 d_m)^{0.55}$ [meters].

The present invention also defines a method of manufacturing a bearing ring, such that the raceway has a roughness pattern with $\gamma \geq 10$. The method comprises a step of grinding the raceway, which is common practice in the manufacture of bearing rings. Grinding results in a surface with a highly directional roughness pattern, oriented in the longitudinal direction. After grinding, a bearing raceway typically undergoes a finishing operation such as honing or lapping, to reduce the roughness heights to a required level for long wear life. Generally, the finishing operation not only makes the surface smoother, but also more isotropic.

According to the method of the invention, the raceway of the bearing ring is subjected to a finishing operation that reduces the roughness heights of the raceway, without modifying the directionality provided by grinding. A suitably controlled honing process may be applied.

Thus a bearing with increased resistance to micropitting can be produced economically using conventional machinery. Other advantages of the present invention will become apparent from the following detailed description and accompanying drawings.

DESCRIPTION OF THE FIGURES

In the following, the invention is described with reference to the accompanying drawings, in which.

DETAILED DESCRIPTION

Figure 1:
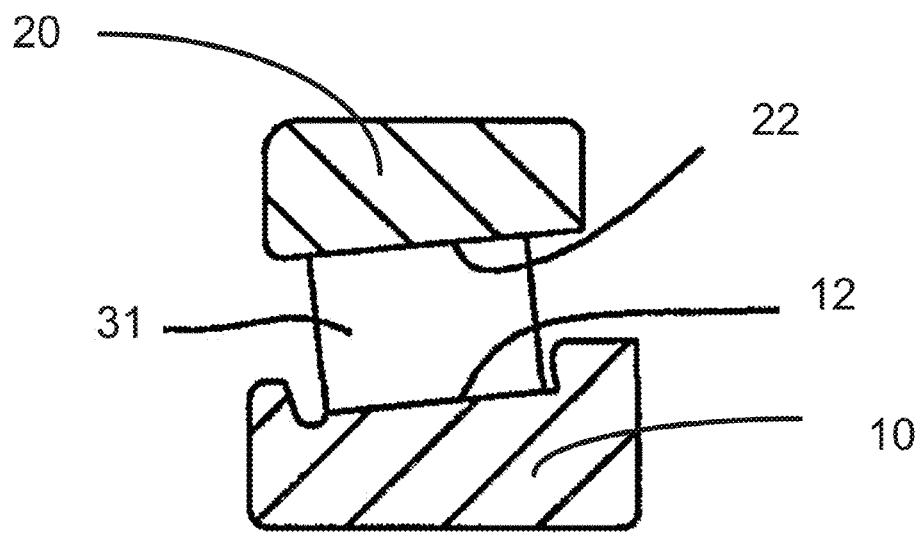
FIG. 1 shows a sectional view of part of a rolling element bearing.

FIG. 1 shows a partial, sectional view of an example of a rolling element bearing. In the depicted example, the bearing is a tapered roller bearing comprising a plurality of tapered rollers disposed between an inner ring 10 and an outer ring 20. Each roller has an outer cylindrical surface 31 that is in rolling contact with an inner raceway 12 on the inner ring and an outer raceway 22 on the outer ring. A rolling contact interface is defined between the outer cylindrical surface 31 of each roller and the inner and outer raceways 12, 22. During bearing operation, the rollers will also experience some slip (sliding contact) in the direction of rolling, which will be designated as the x direction.

In boundary or mixed-lubrication, when the lubricant film at a rolling contact interface has insufficient thickness to separate the contact, surface irregularities will influence the way that dry and lubricated spots are distributed within the contact. Discontinuities in surface traction and possible stress concentrations must also be considered. High roughness (or high roughness slopes) will promote local film collapse, high contact pressures and tractions. This will enhance stress concentrations in the critical areas of traction discontinuities. The presence of some sliding favors surface tractions, and the inventors have found that micropitting appears first in areas of pressure discontinuities (high pressure gradients) associated with roughness.

The present invention defines a bearing in which the rolling contact surfaces that define a rolling contact interface have a surface topography that is adapted to minimize micropitting.

Figure 2:
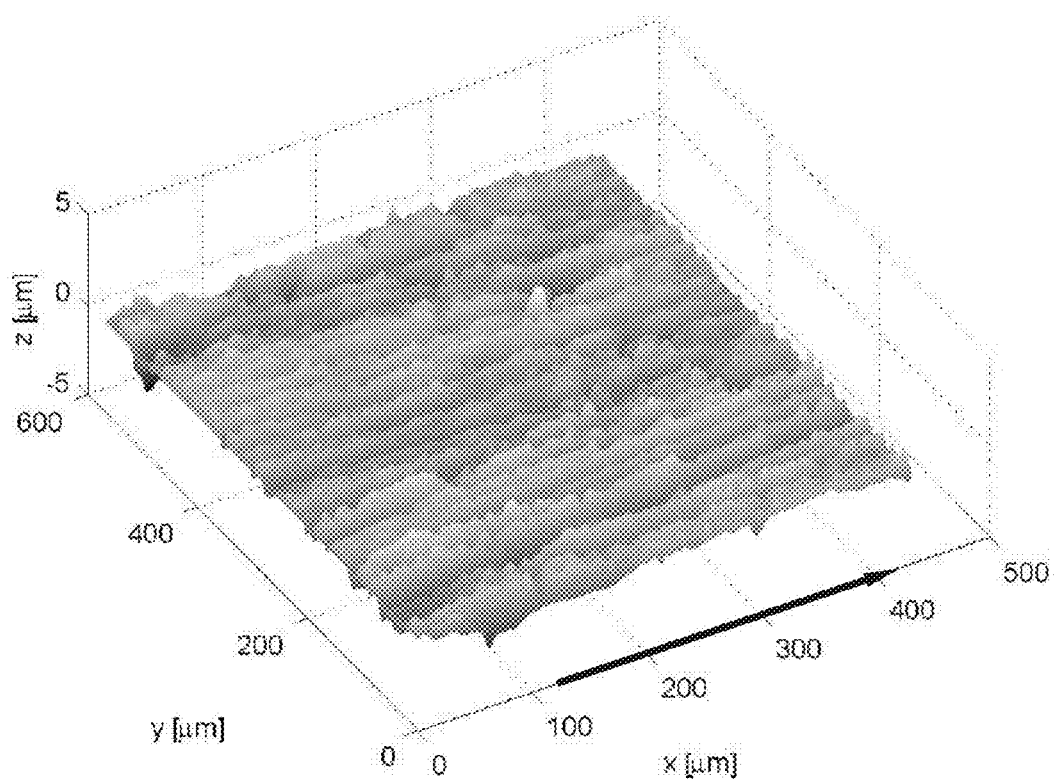
FIG. 2 shows a surface topography with a longitudinal roughness lay.

Firstly, the roller surface 31 and the bearing raceways 12, 22 have a roughness pattern oriented in the longitudinal direction. An example of a longitudinal roughness pattern is depicted in FIG. 2. In the direction of rolling (x-axis), the asperities have a length greater than their width in the transverse direction (y-axis). The height of asperities is shown on the z-axis.

Specifically, at least one of the bearing raceways, and preferably both raceways, has a roughness pattern, expressed in terms of the Peklenik number $\gamma$, whereby $\gamma \geq 10.0$. Preferably, $\gamma \geq 12.0$. The Peklenik number may be expressed by the following equation:

$$\gamma = \frac{\lambda_{0.5x}}{\lambda_{0.5y}},$$

where $\lambda_{0.5}$ is the length at which the autocorrelation function of a roughness profile reduces to half its initial value, at $\lambda=0$, whereby $\lambda$ is the lag. The roughness profile is measured in the direction of rolling x and in the transverse direction y, whereby it is assumed that the x and y profiles are described by an essentially linear autocorrelation function.

The problem may be reduced to the numerical calculation of an autocorrelation matrix A comprising rows (x) and columns (y), so that one can look in the rows and columns to find the location where the value of A becomes A/2. The x-location will give $\lambda_{0.5x}$ and the y-location will give $\lambda_{0.5y}$.

The autocorrelation matrix for the x and y profiles are respectively given by:

$$A(x-\lambda) = \int_{-\infty}^{\infty}\int_{-\infty}^{\infty} z(x,y)z(x-\lambda,y)\,dx\,dy$$

$$A(y-\lambda) = \int_{-\infty}^{\infty}\int_{-\infty}^{\infty} z(x,y)z(x,y-\lambda)\,dx\,dy$$

whereby z (x, y) is the function that describes the surface. Then:

For $\lambda_{0.5x}$, find A such that $A(x-\lambda)=0.5\,A(x-0)$, and
For $\lambda_{0.5y}$, find A such that $A(y-\lambda)=0.5\,A(y-0)$.

Using a numerical routine to evaluate the autocorrelation function, $\lambda$ can be found by iteration. The Peklenik number may then be calculated.

The Peklenik number is a measure of surface isotropy and may be visualized as the length-to-width ratio of a representative asperity. Thus, $\gamma=1$ for a perfectly isotropic surface; $\gamma=0$ for a surface with a purely transverse roughness pattern and $\gamma=\infty$ for a surface with a purely longitudinal roughness pattern.

With reference to FIG. 1, the rolling elements in a bearing according to the invention have a rolling contact surface 31 with a Peklenik number of $\gamma \geq 3.0$. In other words, the roller surfaces 31 may possess greater isotropy raceways 12, 22. This is because, in practice, the surface of the rollers is smoother than the raceways and the present inventors have found that—in the presence of poor lubrication conditions and some sliding—micropitting first appears on the smoother surface. The rougher surface imposes a stress history (pressure amplitudes) upon the smoother one. The smoother surface "sees" a fluctuation in pressures (load micro cycles), while all points on the rougher surface always "feel" the same stresses (which are higher in the contact areas and lower in the non-contact areas). In other words, the rougher raceway surface 12, 22 imposes load micro cycles on the smoother surface 31 of each roller, which are therefore more prone to micropitting in the presence of some sliding.

Although the roller surface 31 may have an RMS roughness $R_{q1}$ that is smaller than an RMS roughness $R_{q2}$ of the bearing raceways 12, 22, the difference between the two RMS roughnesses may not be too great. Specifically, in a bearing according to the invention:

$$0.8 \leq \frac{R_{q1}}{R_{q2}} \leq 1.25.$$

Furthermore, the magnitude of the RMS roughnesses in a rolling contact interface has been found to play a role in the minimization of micropitting. Suitably, the surface 31 of the roller and the inner and outer raceways 12, 22 have a maximum RMS roughness that is related to the mean diameter $d_m$ of the bearing as follows:

$R_{q1}$ and $R_{q2} \leq 8 \times 10^{-9}(1000 d_m)^{0.55}$ [meters].

The present inventors have found that other roughness parameters play a role in minimizing micropitting. Suitably, the surface 31 of the roller and the inner and outer raceways 12, 22 have a roughness skewness $R_{sk} \leq -0.1$.

The slope of the roughness profile in the rolling direction (x) and in the transverse direction (y) is also of importance, particularly in bearings with a mean diameter $d_m$ smaller than 300 mm. Suitably, the surface 31 of the roller and the inner and outer raceways 12, 22 have a slope parameter, $R_{\Delta qx}$, in the direction of rolling x, and a slope parameter, $R_{\Delta qy}$, in the transverse direction y, with the following values when $d_m \leq 300$ mm:

$R_{\Delta qx} \leq 15$ mrad
$R_{\Delta qy} \leq 45$ mrad,

In large-size bearings having a mean diameter $d_m > 300$ mm:

$R_{\Delta qx} \leq 30$ mrad
$R_{\Delta qy} \leq 90$ mrad,

Examples

Three calculation examples were evaluated using a micropitting model as described in "Micropitting Modeling in Rolling-Sliding Contacts: Application to Rolling Bearings", developed by the present inventors and published in Tribology Transactions, vol. 54, 2011.

Example A represents a rolling contact interface with roughness parameters as prescribed by the invention. Examples B and C represent comparative rolling contact interfaces with certain roughness parameters which deviate from the prescribed ranges. The corresponding values of the roughness parameters are shown in Table 1 below.

In each example, a maximum Hertzian contact pressure of 1.16 GPa and standard lubrications conditions were.

After 1 million loading cycles, the results for the rolling contact interface of example A showed barely any micropitting; the results for the rolling contact interface of example B showed severe micropitting; and the results for the rolling contact interface of example C showed moderate micropitting. The problematic values of the roughness parameters which are thought to be responsible for the increased micropitting in examples B and C are underlined in Table 1.

TABLE 1

| | Example | | | | | |
|---|---|---|---|---|---|---|
| | (A) | | (B) | | (C) | |
| Surface | I | II | I | II | I | II |
| $R_q$, nm | 107.7 | 107.7 | 107.7 | 323 | 107.7 | 107.7 |
| $R_{qI}/R_{qII}$ | 1 | | 3 | | 1 | |
| $R_{\Delta qx}$, mrad | 12.29 | 7.256 | 12.29 | 21.77 | 44.41 | 26.2 |
| $R_{\Delta qy}$, mrad | 44.41 | 26.2 | 44.41 | 78.6 | 12.29 | 7.256 |
| $R_{sk}$ | −0.3579 | −0.5811 | −0.3579 | −0.5811 | −0.3579 | −0.5811 |
| γ | 14.14 | 13.20 | 14.14 | 13.20 | 0.071 | 0.076 |

A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

The invention claimed is:

1. A bearing comprising:
   a plurality of rolling elements arranged between an inner raceway and an outer raceway of the bearing; and
   a rolling contact interface being defined between a first rolling contact surface on at least one rolling element and a second rolling contact surface formed by one of the inner and outer raceways,
   wherein the first rolling contact surface has a first RMS roughness $R_{q1}$ and a first roughness pattern $\gamma_1$, expressed in terms of the Peklenik number; and
   wherein the second rolling contact surface has a second RMS roughness $R_{q2}$ and a second roughness pattern $\gamma_2$, expressed in terms of the Peklenik number,
   wherein the rolling contact interface has a surface topography in which:
   (a) the first roughness pattern $\gamma_1$ of the first rolling contact surface and the second roughness pattern $\gamma_2$ of the second rolling contact surface are oriented in the direction of rolling (x), whereby $\gamma_1 \geq 3.0$ and $\gamma_2 \geq 10.0$; and
   (b) the first rolling contact surface and the second rolling contact surface have a substantially equal RMS roughness, whereby $0.8 \leq R_{q1}/R_{q2} \leq 1.25$.

2. The bearing of claim 1, wherein each of the first rolling contact surface and the second rolling contact surface has a roughness skewness, $R_{SK}$, with a value of $R_{SK} \leq -0.1$.

3. The bearing of claim 1, wherein the bearing has a mean diameter $d_m$, and wherein an RMS slope $R_{\Delta qx}$ of a roughness profile, measured in the direction of rolling, and an RMS slope $R_{\Delta qy}$ of a roughness profile, measured in a direction transverse to the direction of rolling, of each of the first rolling contact surface and the second rolling contact surface, have the following values when $d_m \leq 300$ mm:
   $R_{\Delta qx} \leq 15$ mrad
   $R_{\Delta qy} \leq 45$ mrad,
   and have the following values when $d_m > 300$ mm:
   $R_{\Delta qx} \leq 30$ mrad
   $R_{\Delta qy} \leq 90$ mrad.

4. The bearing of claim 3, wherein the first RMS roughness $R_{q1}$ and the second RMS roughness $R_{q2}$ have a value (in meters) of $\leq 8 \times 10^{-9} (1000 \, d_m)^{0.55}$.

5. The bearing of claim 1, wherein the bearing is one of: a cylindrical roller bearing, a spherical roller bearing, a tapered roller bearing, a toroidal roller bearing, or a needle roller bearing.

6. A method of manufacturing a bearing ring comprising a bearing raceway, the method comprising:
   subjecting the raceway to a grinding operation that creates asperities with a longitudinal directionality on the raceway,
   wherein the grinding operation is followed by a mechanical finishing operation in which asperity heights are reduced without modifying the directionality of the asperities to produce a finished raceway having a roughness pattern with a Peklenik number of $\gamma \geq 10.0$.

* * * * *